United States Patent
Steuernagel et al.

(10) Patent No.: US 8,838,309 B2
(45) Date of Patent: Sep. 16, 2014

(54) METHOD AND DEVICE FOR OPERATING A HYBRID DRIVE FOR A VEHICLE

(75) Inventors: Frank Steuernagel, Stuttgart (DE); Alexander Maass, Ludwigsburg (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 13/128,606

(22) PCT Filed: Oct. 27, 2009

(86) PCT No.: PCT/EP2009/064108
§ 371 (c)(1),
(2), (4) Date: Aug. 25, 2011

(87) PCT Pub. No.: WO2010/057746
PCT Pub. Date: May 27, 2010

(65) Prior Publication Data
US 2011/0301797 A1  Dec. 8, 2011

(30) Foreign Application Priority Data

Nov. 20, 2008 (DE) .......................... 10 2008 043 945

(51) Int. Cl.
*B60L 11/00* (2006.01)
*B60W 20/00* (2006.01)
*B60W 10/08* (2006.01)
*F02N 99/00* (2010.01)
*B60W 10/02* (2006.01)
*B60K 6/48* (2007.10)
*F02N 19/00* (2010.01)
*F02N 5/04* (2006.01)
*B60W 10/06* (2006.01)

(52) U.S. Cl.
CPC ............... *B60W 10/06* (2013.01); *B60W 20/00* (2013.01); *B60W 10/08* (2013.01); *F02N 99/002* (2013.01); *B60W 10/02* (2013.01); *B60K 6/48* (2013.01); *F02N 99/006* (2013.01); *F02N 19/00* (2013.01); *Y02T 10/6286* (2013.01); *F02N 5/04* (2013.01); *Y02T 10/6221* (2013.01)
USPC ........ 701/22; 123/192.1; 180/65.1; 180/65.2; 180/65.4; 60/285; 73/117.3; 307/9.1; 318/400.21; 475/5

(58) Field of Classification Search
CPC .......... B60L 11/00; B60L 1/00; B60W 20/00; B60W 10/06; B60W 10/08; G06F 19/00; B60K 1/00; F01N 3/00; H02H 7/08; H02K 11/00; F16H 57/08; F02B 75/06; G01L 3/26
USPC ................ 701/22; 123/192.1; 180/65.1, 65.2, 180/65.4; 60/285; 73/117.3; 307/9.1; 318/400.21; 475/5
See application file for complete search history.

(56) References Cited

U.S. PATENT DOCUMENTS 6,119,799 A    9/2000  Morisawa et al.
6,158,405 A *  12/2000 Masberg et al. ........... 123/192.1
(Continued)

FOREIGN PATENT DOCUMENTS

DE   10 2005 049992    4/2007
DE   10 2006 008640    8/2007
(Continued)

*Primary Examiner* — James Trammell
*Assistant Examiner* — Sanjeev Malhotra
(74) *Attorney, Agent, or Firm* — Kenyon & Kenyon LLP

(57) ABSTRACT

A method and a device for operating a hybrid vehicle, which ascertain the torque necessary for starting the non-operating internal combustion engine, and this torque is reserved by an additional drive unit. The torque necessary for starting the non-operating internal combustion engine is minimized by appropriately adjusting parameters of the internal combustion engine system.

7 Claims, 2 Drawing Sheets

(56) References Cited

U.S. PATENT DOCUMENTS

| | | | |
|---|---|---|---|
| 6,487,998 B1* | 12/2002 | Masberg et al. | 123/192.1 |
| 2005/0182533 A1* | 8/2005 | Tobler et al. | 701/22 |
| 2006/0011394 A1* | 1/2006 | Colvin et al. | 180/65.2 |
| 2006/0213186 A1* | 9/2006 | Pott | 60/285 |
| 2007/0101806 A1* | 5/2007 | Yamaguchi | 73/117.3 |
| 2007/0137906 A1* | 6/2007 | Seminara et al. | 180/65.1 |
| 2007/0193795 A1* | 8/2007 | Forsyth | 180/65.4 |
| 2009/0174254 A1* | 7/2009 | Winter et al. | 307/9.1 |
| 2009/0174351 A1* | 7/2009 | Eisenhardt | 318/400.21 |
| 2009/0176611 A1* | 7/2009 | Avery | 475/5 |
| 2011/0112708 A1* | 5/2011 | Fassnacht | 701/22 |

FOREIGN PATENT DOCUMENTS

| | | |
|---|---|---|
| DE | 10 2006 012384 | 9/2007 |
| EP | 1 450 037 | 8/2004 |
| EP | 1 526 277 | 4/2005 |
| WO | WO 2006/034520 | 4/2006 |

* cited by examiner

METHOD AND DEVICE FOR OPERATING A HYBRID DRIVE FOR A VEHICLE

FIELD OF THE INVENTION

The present invention relates to a method for operating a hybrid drive for a vehicle in which a first drive unit and a second drive unit jointly determine the power of the vehicle, and a device for carrying out the method.

BACKGROUND INFORMATION

Vehicles having hybrid drives are being increasingly developed in which various drives are used for a drive task. The individual drives in the hybrid drive are able to cooperate in different ways. The individual drives either act together, partly together, or individually to operate the vehicle.

In so-called parallel hybrids, multiple drive units are coupleable to the drive shaft. Other hybrid designs are known besides the parallel hybrid vehicles, for example axle hybrid designs in which in each case at least one drive unit acts on one driven vehicle axle. A hybrid vehicle having two drive units is described in German Patent No. DE 10 2006 008 640. The vehicle has an internal combustion engine as a first drive unit, and has an electric machine as a second drive unit. The cited document discloses a method in which the internal combustion engine is started from the "solely electric driving" operating mode of the hybrid drive with the aid of a starterless direct start. It is also known that in certain configurations of the drive units (parallel hybrid, for example), the internal combustion engine that is present may be completely disconnected from the wheels and/or from the drive train with the aid of a separating clutch. It is thus possible to set the motor vehicle in motion, with the internal combustion engine not operating, solely via the electric drive ("electric driving").

If, during electric driving, the driver requires a higher drive torque than the electric machine alone is able to provide, the internal combustion engine is started. For this internal combustion engine restart, the internal combustion engine may be set in motion via the slipping separating clutch. A portion of the drive torque of the electric machine is needed for starting and accelerating the internal combustion engine. To prevent the driver from withdrawing drive torque from the propulsion of the vehicle during this operation, the torque required for the restart is always kept as a "reserve," so that for solely electric driving it is not possible to use the full torque of the electric machine for the propulsion of the vehicle.

Alternatively, it is possible in principle to set the internal combustion engine in motion via suitable fuel injections and ignitions, independently from the vehicle and vehicle drive. Such a start is referred to as a direct start. The direct start has been analyzed in conjunction with start-stop systems for non-hybrid drives. Under unfavorable conditions the direct start fails, so that for a nonhybrid vehicle, direct start is not suitable as the sole starting method. A failed direct start attempt generates considerable emissions, and therefore should be avoided whenever possible.

SUMMARY OF THE INVENTION

The method according to the present invention for operating a hybrid vehicle, having an internal combustion engine system which has an internal combustion engine and at least one additional drive unit, ascertains the torque necessary for starting the non-operating internal combustion engine, and the torque is reserved by the additional drive unit, and is characterized in that the torque necessary for starting the non-operating internal combustion engine is minimized by appropriately adjusting parameters of the internal combustion engine system. The underlying technical background is that the torque of the additional drive unit which is used for the drive of the vehicle is normally limited. The limitation is selected in such a way that sufficient torque is still reserved to allow the internal combustion engine to be reliably started by engaging a clutch, in particular for the parallel hybrid, between the additional drive unit and the internal combustion engine. The reserved torque of the additional drive unit is utilized, and the torque necessary for starting the internal combustion engine is thus compensated for Depending on the situation, the actual torque necessary for starting the internal combustion engine varies. The torque necessary for starting the internal combustion engine is deduced by detecting various parameters of the internal combustion engine system. The parameters of the internal combustion engine system, in particular the position of the crankshaft and the temperature of the internal combustion engine as well as the instantaneous injection pressure, have an influence on the torque necessary for starting the internal combustion engine. Further parameters which are taken into account are in particular the intake manifold/cylinder charge, the shutoff time for the internal combustion engine, and/or the altitude. Due to the combustibility of the mixture and the emission standards ("lambda 1 control"), the oxygen present in the cylinder in particular is critical for the deliverable quantity of fuel, and thus also for the achievable torque. The torque to be achieved must accelerate the cylinders of the internal combustion engine to such a degree that the next compression stroke is carried out due to the inertia of the accelerated mass.

Another critical factor in particular is the design of the internal combustion engine (gasoline or diesel internal combustion engine) on account of the compression forces to be overcome. Gasoline internal combustion engines generally have lower compression forces. Another particularly critical factor is the number of cylinders. A suitable cylinder position is more unlikely for a one-cylinder engine than for a 12-cylinder engine. Another particularly critical factor is a direct injection system, since the mixture combusts in the cylinder and the torque is generated in the cylinder. Typical operating temperatures are in particular between 20° C. and 85° C. A crankshaft angle of a cylinder of the internal combustion engine which is approximately at 100° crankshaft angle after top dead center is particularly suitable. To be able to utilize as much as possible of the available torque of the second drive unit for the drive of the vehicle, the parameters of the internal combustion engine system are adjusted in such a way that the least possible torque is required for starting the internal combustion engine.

Thus, the method has the advantage that the torque necessary for starting the non-operating internal combustion engine is minimized, and a greater proportion of the torque of the additional drive unit may thus be used for the drive of the hybrid vehicle. Operation in more driving situations is thus possible using the additional drive unit, in particular solely electric driving. This results in increased driving enjoyment and longer distances traveled in which the vehicle is operated using the additional drive unit, in particular in an emission-free manner and in particular at higher driving speeds. Better use is made of the available power of the additional drive unit, in particular the electric machine, and/or the capacity of the installed energy storage system (battery, for example). This advantageously results in higher efficiency for the drive with the aid of the additional drive unit. The service life of the clutches and/or the starter is increased, since these components are used less frequently or are required to do less work when in use. If the crankshaft of the internal combustion engine is at a cylinder shutdown angle in which a direct start is expected to fail, the internal combustion engine and the clutch, in particular the separating clutch between the internal combustion engine and the additional drive unit, are able to divide up the torque to run up the internal combustion engine; i.e., the clutch then only needs to transmit a much lower torque than when it used alone to start the internal combustion engine. This torque applied by the additional drive unit, in particular the electric machine, is no longer available to the vehicle drive. Ideally, before the restart is begun the torque needed by the additional drive unit for starting the internal combustion engine is thus ascertained and kept as a torque reserve. If the internal combustion engine does not accelerate as quickly as expected during a direct start attempt, as an emergency approach the running up of the internal combustion engine may still be assisted (as early as possible) with additional torque by engaging the clutch. As an alternative approach which is less advantageous, the internal combustion engine may attempt a direct start independently of the angular position of the crankshaft and temperature. The clutch assists, but with a generally smaller torque than would be required for solely starting using the clutch. This additionally accelerates the starting operation and also has a beneficial effect on the startup emissions. Alternatively, the clutch is engaged, at least partially, only temporarily and/or in synchronization with the crankshaft motion.

One refinement of the present invention is characterized in that the parameters of the internal combustion engine system are adjusted in such a way that the internal combustion engine may be started by direct start. The underlying technical background is that torque from the additional drive unit is thus no longer needed for the direct start of the internal combustion engine. The direct start is possible in particular when parameters of the internal combustion engine system are favorable, in particular for a favorable crankshaft angular position of the internal combustion engine, a suitable temperature of the internal combustion engine, and a suitable injection pressure. This results in the advantage that the torque necessary for starting the non-operating internal combustion engine is minimized, and therefore the entire available torque of the additional drive unit may be used for the drive of the hybrid vehicle. In hybrid drives, a drive unit which is necessary for starting the internal combustion engine, in particular a starter, is relieved with the aid of the direct start, thus allowing a longer service life of the drive unit. The early ignition of the internal combustion engine which is used for the direct start results in improved emissions when the internal combustion engine is started. The possibility of stranded vehicles, in particular vehicles which are no longer drivable due to a breakdown, which may be due to a defective starter is prevented. If it is determined during a restart attempt that the separating clutch is defective in such a way that it is no longer able to transmit enough torque for starting the internal combustion engine, a solely direct start may be initiated as an emergency approach. The unfavorable emissions which may result in order to avoid a stalled vehicle may be tolerated in this exceptional case. When a direct start fails, the starting operation of the internal combustion engine is assisted in a continuous and/or variable manner by activating the clutch as a function of parameters, in particular the parameters of the internal combustion engine system, in particular using the lowest possible assisting torque. Thus, any available torque which is not needed for starting the internal combustion engine may be used for the propulsion of the vehicle.

One refinement of the present invention provides that, based on an evaluation of the parameters of the internal combustion engine system, it is determined whether or not a direct start of the internal combustion engine is possible. The underlying technical background of this embodiment is that, based on this evaluation, a decision may be made whether a torque necessary for starting the non-operating internal combustion engine must be reserved by the additional drive unit, or whether the entire available torque of the additional drive unit may be used for the further propulsion. The advantage of this embodiment is that for the case in which a direct start of the internal combustion engine may be carried out, the entire available torque of the additional drive unit may be used for the drive of the vehicle.

Another refinement of the present invention provides that when it is determined that a direct start of the internal combustion engine is possible, no torque for starting the internal combustion engine is reserved by the additional drive unit. Once again, it is advantageous that the entire torque of the additional drive unit may be used for the propulsion of the vehicle. If, while driving with the aid of the additional drive unit, in particular during electric driving, it is known that the crankshaft of the internal combustion engine is in a favorable crankshaft angular position and the internal combustion engine has a suitable temperature, so that the direct start may be successfully carried out, reserving a torque which is necessary for starting the internal combustion engine, in particular the torque reserve, may be dispensed with, and the maximum torque of the additional drive unit, in particular the electric machine, may be used for the propulsion of the vehicle.

Another refinement of the present invention provides that the internal combustion engine has a crankshaft which is coupleable to a shaft with the aid of a clutch, it being possible, by at least partially engaging the clutch, to move the crankshaft of the internal combustion engine into a position which allows a direct start of the internal combustion engine. The underlying technical background of this refinement is that a parameter of the internal combustion engine system may thus be adjusted in such a way that the internal combustion engine may be started with the aid of direct start, in particular with less torque assistance with the aid of direct start.

In this, in particular best, case, the direct start of the internal combustion engine is made possible by rotating the crankshaft into a favorable position. For this purpose, by at least partially engaging the clutch the crankshaft is connected a rotating shaft, for example to the shaft of the additional drive unit, or is mechanically connected to a rotating drive axle, and is moved into a predefined position. The advantage of this refinement is that the internal combustion engine system is thus brought into a state in which a direct start is possible, and therefore in the further operation of the hybrid vehicle the entire torque of the additional drive unit may be used for the propulsion. After the internal combustion engine is shut off, its crankshaft, in particular at a suitable temperature, may be rotated, with the aid of a slipping separating clutch (via very brief slipping pulses, for example), into a crankshaft angular position from which a direct start is possible. The torque reserve is subsequently minimized, as described above, and for driving with the aid of the additional drive unit, in particular during electric driving, the maximum torque of the additional drive unit, in particular the electric machine, is used for the vehicle drive, since the internal combustion engine may be started with the aid of the direct start without additional assistance.

The device according to the present invention for operating a hybrid vehicle, having an internal combustion engine system which has an internal combustion engine and at least one additional drive unit, has means (111, 209) which ascertain the torque necessary for starting non-operating internal combustion engine (101, 201), and this torque is reserved by additional drive unit (103, 203), characterized in that means (111, 209) minimize the torque necessary for starting non-operating internal combustion engine (101, 201) by appropriately adjusting the parameters of the internal combustion engine system. The underlying technical background is that the torque necessary for starting the internal combustion engine is deduced by detecting various parameters of the internal combustion engine system. To be able to utilize as much as possible of the available torque of the second drive unit for the drive, the parameters of the internal combustion engine system are adjusted in such a way that the least possible torque is required for starting the internal combustion engine. The method thus has the advantage that the torque necessary for starting the non-operating internal combustion engine is minimized, and a greater proportion of the torque of the additional drive unit may thus be used for the drive of the hybrid vehicle.

In another refinement of the present invention, it is provided that the hybrid vehicle is designed as an axle hybrid, a parallel hybrid, or a power split hybrid. The underlying technical background of this refinement is that the present invention may be implemented in various hybrid drive designs. For example, the parameters of the internal combustion engine system are adjusted for minimizing the torque necessary for starting the internal combustion engine in such a way that, for example, by at least partially engaging the clutch the crankshaft of the internal combustion engine may be moved into a position which allows a direct start. In a parallel hybrid drive and in a power split hybrid drive, an additional drive unit may be mechanically connected to the crankshaft of the internal combustion engine by engaging the clutch. In an axle hybrid there is no direct mechanical coupling between an additional drive unit and the crankshaft of the internal combustion engine, but a force may act on the crankshaft of the internal combustion engine when, for a vehicle driving with the aid of axle hybrid drive, the internal combustion engine is mechanically coupled to the rotating drive axle, for example by engaging a clutch. In the vehicles, in particular vehicles having an axle hybrid drive, components such as a starter, starter generator, or belt starter, for example, on the internal combustion engine may be dispensed with. In vehicles having an axle hybrid drive, which for example have no additional drive unit, in particular an electric machine, on the internal combustion engine drive axle, via the direct start with the aid of a slipping starter clutch (and an engaged gear) the internal combustion engine may be started while driving. The starting torques for the internal combustion engine which are necessary for this purpose, as described above, are lower than in the case of a completely started non-operating internal combustion engine. To allow a reliable direct start, the additional drive unit assists the vehicle drive via the other axle. Here as well, the torque additionally required by the additional drive unit must be kept as a torque reserve, and therefore is not usable in the driving operation with the aid of the additional drive unit. For this purpose, components such as a starter, starter generator, or belt starter, for example, on the internal combustion engine may be dispensed with.

DETAILED DESCRIPTION

Figure 1:
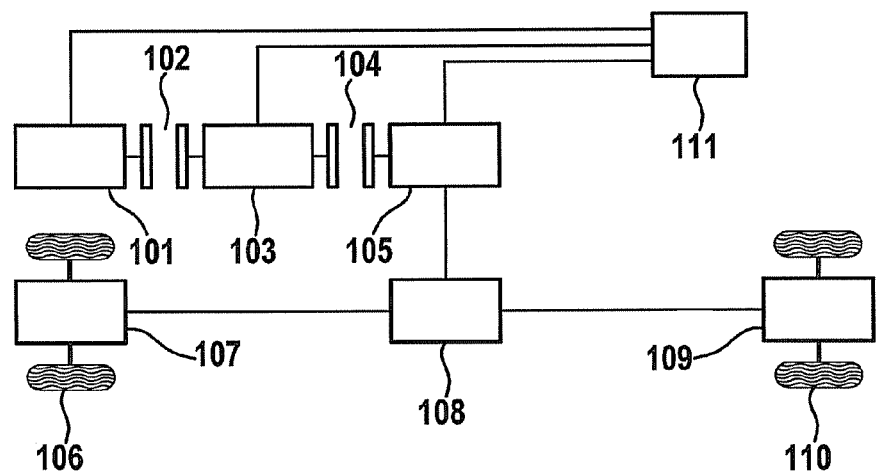
FIG. 1 shows a schematic illustration of a parallel hybrid drive train for a vehicle having all-wheel drive.

FIG. 1 shows a schematic illustration of a parallel hybrid drive train for a vehicle having all-wheel drive. Internal combustion engine 101 is connected to an additional drive unit 103 via a clutch 102. This additional drive unit may be designed as an electric machine or as a hydraulic drive, for example. With the aid of an additional clutch 104, the two drive units may be coupled to the drive axle of the vehicle via differentials 107, 108, and 109 via transmission 105. Reference numerals 106 and 110 represent the drive axles of the vehicle. The illustration shows an all-wheel drive vehicle, although other forms of drives, for example a single-axle drive, are conceivable. Control unit 111 is able to exchange information, for example with drive units 101 and 103, transmission 105, and/or clutches 102 and 104, and evaluate same, and emit control signals, in particular to the named components. The functions of control unit 111 may be distributed as desired over other control units of the vehicle, and/or may be coupled to the control electronics system of vehicle components.

Figure 2:
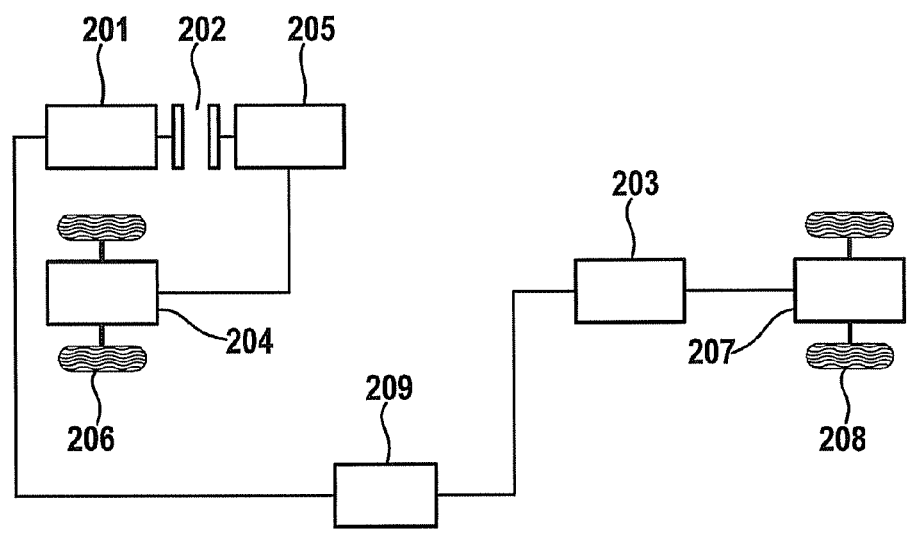
FIG. 2 shows a schematic illustration of an axle hybrid drive train for a vehicle having all-wheel drive.

FIG. 2 shows a schematic illustration of an axle hybrid drive train for a vehicle having two driven axles, for example, in particular having an all-wheel drive. Internal combustion engine 201 is coupled to transmission 205 via a clutch 202, and to drive axle 206 via differential 204. The named components represent the drive for the first axle of the hybrid vehicle. Second axle 208 is driven with the aid of additional drive unit 203, for example directly via differential 207. An additional transmission, not illustrated, may be provided in particular between differential 207 and electric machine 203, which in particular is independently shiftable, and activatable via a control unit, for example. Once again, various drives, for example an electric machine or a hydraulic drive, are conceivable as an additional drive unit. Control unit 209 is connected to drive units 201 and 203, transmission 205, and/or clutch 202, for example, for data exchange, and is also able to emit control signals, in particular to the named components. The functions of control unit 209 may be distributed as desired over other control units of the vehicle, and/or may be coupled to the control electronics system of vehicle components.

Figure 3:
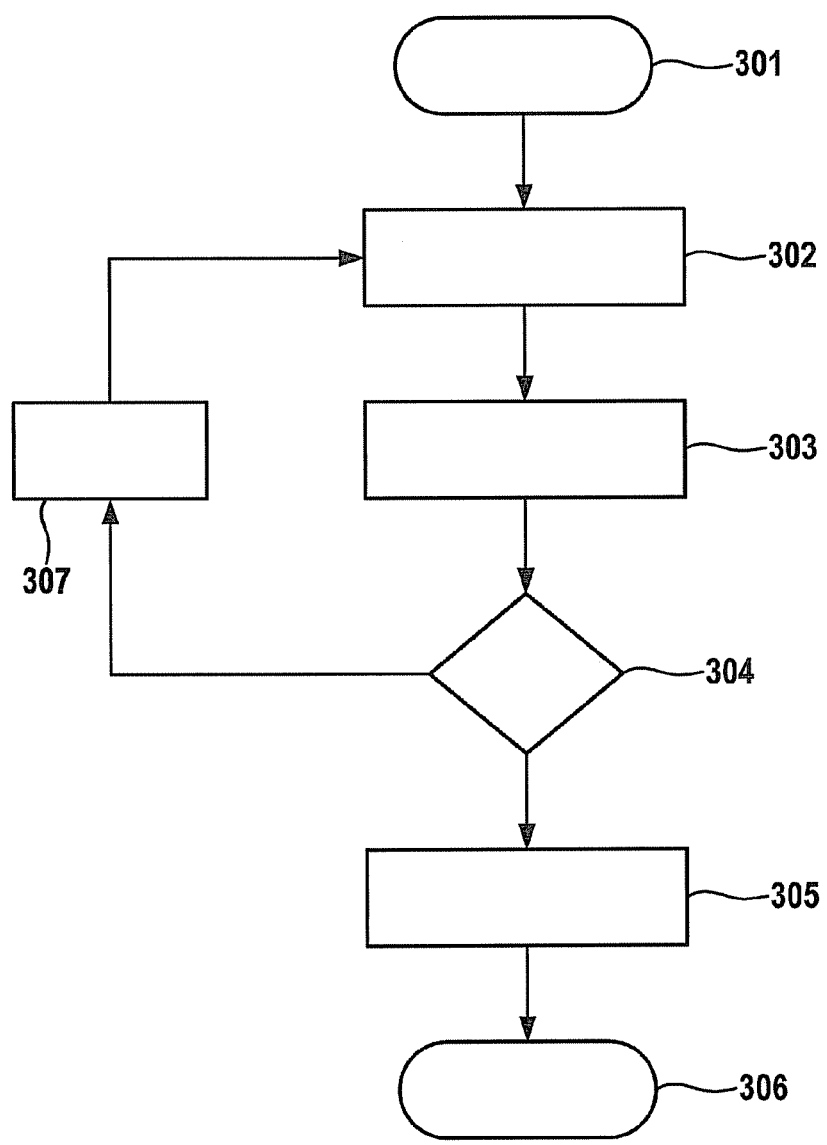
FIG. 3 shows a method for operating a hybrid vehicle.

FIG. 3 shows a method for operating a hybrid drive for a vehicle. The method is started in step 301. The torque necessary for starting the non-operating internal combustion engine is subsequently ascertained in step 302. Depending on the evaluation from step 302, the second drive unit is activated in step 303 in such a way that the torque necessary for starting the non-operating internal combustion engine is always reserved and is therefore available. A query is made in step 304 as to whether the internal combustion engine should be started. If the internal combustion engine is not to be started at that moment, the method branches to step 307, in which the torque necessary for starting the non-operating internal combustion engine is minimized by adjusting parameters of the internal combustion engine system. If it is determined in step 304 that the internal combustion engine should be started, the internal combustion engine is started in step 305. The method terminates with step 306.

What is claimed is:

1. A method for operating a hybrid vehicle, having an internal combustion engine system which includes an internal combustion engine and at least one additional drive unit, the method comprising:

ascertaining a torque necessary for starting a non-operating internal combustion engine; reserving the torque by the additional drive unit;

minimizing the torque necessary for starting the non-operating internal combustion engine by adjusting parameters of the internal combustion engine system; and determining, by a processor, based on an evaluation of the parameters of the internal combustion engine system, whether or not a direct start of the internal combustion engine is possible.

2. The method according to claim 1, wherein the parameters of the internal combustion engine system are adjusted in such a way that the internal combustion engine may be started by a direct start.

3. The method according to claim 1, wherein, when it is determined that a direct start of the internal combustion engine is possible, no torque for starting the internal combustion engine is reserved by the additional drive unit.

4. The method according to claim 1, wherein the internal combustion engine has a crankshaft which is coupleable to a shaft with the aid of a clutch, it being possible, by at least partially engaging the clutch, to move the crankshaft of the internal combustion engine into a position which allows a direct start of the internal combustion engine.

5. A device for operating a hybrid vehicle, having an internal combustion engine system which includes an internal combustion engine and at least one additional drive unit, the device comprising:
  means for ascertaining a torque necessary for starting a non-operating internal combustion engine, the torque being reserved by the additional drive unit;
  means for minimizing the torque necessary for starting the non-operating internal combustion engine by adjusting parameters of the internal combustion engine system; and
  means for determining, based on an evaluation of the parameters of the internal combustion engine system, whether or not a direct start of the internal combustion engine is possible.

6. The device according to claim 5, wherein the hybrid vehicle is an axle hybrid.

7. The device according to claim 5, wherein the hybrid vehicle is a parallel hybrid.

* * * * *